United States Patent [19]

Mongault

[11] 4,232,413
[45] Nov. 11, 1980

[54] DEVICE FOR USE AS A COT ON THE REAR SEAT OF A VEHICLE

[76] Inventor: Jacques H. C. Mongault, 82 rue Dutot, 75015 Paris, France

[21] Appl. No.: 947,098

[22] Filed: Sep. 29, 1978

[30] Foreign Application Priority Data

Oct. 3, 1977 [FR] France ................... 77 29626

[51] Int. Cl.³ .................. A47C 27/08; A47F 1/00
[52] U.S. Cl. ............................ 5/94; 5/114; 5/118
[58] Field of Search ............ 5/12, 93, 94, 99 R–99 C, 5/110, 118

[56] References Cited

U.S. PATENT DOCUMENTS

| | | | |
|---|---|---|---|
| 2,772,423 | 12/1956 | Linden | 5/94 |
| 3,735,430 | 5/1973 | Platz | 5/94 |
| 3,789,439 | 2/1974 | Berg | 5/99 C |
| 3,882,557 | 5/1975 | Stehlik | 5/94 |

FOREIGN PATENT DOCUMENTS

456120  4/1949  Canada ........................... 5/94

*Primary Examiner*—Casmir A. Nunberg
*Attorney, Agent, or Firm*—Darby & Darby

[57] ABSTRACT

A device for use as a cot on the rear seat of a vehicle formed by a U-shaped frame, the front of which is to be placed adjoining the rear of the front seat of the vehicle. A web of cloth is stretched between the member of the frame, the portion of the cloth on the frame open side resting on the cushion of the rear seat. The front of the frame can have support legs to rest on the floor of the vehicle or straps to be attached to the front seat or another part of the vehicle. The web also can have a strap to be attached to a part of the body to keep the web taut.

22 Claims, 12 Drawing Figures

DEVICE FOR USE AS A COT ON THE REAR SEAT OF A VEHICLE

The present invention relates to devices permitting the use of the rear seats of a vehicle as cots.

It has been found that, when traveling for long distances in an automobile whose rear seats are occupied by children, that there often comes a time when the children feel the need to sleep. As a result, they stretch out as well as possible on the seat, which offers little room for this purpose, and they run the risk of injury or harm from falling between the front and rear seats of the vehicle with the slightest movement or unbalance. From all evidence, they have very little room to stretch in a safe and comfortable position, which, in the present state of matters, offers great dangers.

The device according to the invention avoids these drawbacks. It makes it possible, in particular, to increase the room to be used by the children and fills the space between the rear seat and the backs of the front seats of the vehicle.

One of the objects of the invention is that the device insures maximum comfort and safety for the passengers in the rear seats of the vehicle.

One of the objects of the invention is that the device may be easily installed in any type of vehicle.

One of the objects of the invention is that the device occupy the least possible space when it is stored, for example, in the trunk of the vehicle.

One of the other objects of the invention is that the device be simple, light, reliable, safe and inexpensive.

The device which is the object of the invention has an open and rigid structure with three sides, between which a four-sided web of flexible cloth is stretched. The unstructured side of the device partly covers the rear seat of the vehicle and presses thereon in such a way as to assume its shape. The opposite, structured side of the device is held against the backs of the front seats with the aid of straps attached in front of the device to bodywork elements of the car or by means of feet resting on the floor. The device thus installed has a horizontal plane in the extension of the seat, which fills up the space ordinarily existing between the rear seat and the front seats of the vehicle.

According to an advantageous form of embodiment according to the invention, the device is collapsible, and the open and rigid structure of the device is formed by tubes of aluminum alloy articulated together, which have a U-shape when they are unfolded in order to use the device. When folded the tubes appear in the form of a bundle of parallel tubes around which the web of flexible cloth is easily and naturally wound for convenient and compact storage of the device.

With this in mind, the rigid U-shaped structure of the device includes a transverse part articulated in the middle, the opening of the two components of which is limited to about 180°. Each of the two components comprises, in one plane, an articulated, lateral, rigid element forming a supporting foot and a means for locking this articulated supporting foot as well as a means for locking the first named articulation, the stretching of the web of flexible cloth being insured at the moment of the opening of the device by the locking of the articulations of the structural elements of the unfolded device.

Preferably, the median articulation of the transverse structure is a double articulation formed by means of two axes, situated close to one another in the same plane, and supported by a cap, also serving as a stop for the opening of the two transverse elements which, when fully opened, are aligned in the extension of one another while when they are closed they are in parallel position.

Preferably, the articulations of the lateral elements of the open structure as well as the articulations of the supporting feet of the device are made by means of axes supported by caps fixed on the transverse elements involved, so that when in folded position all the rigid components of the device are regrouped parallel to one another, and when in unfolded position, the lateral elements constitute, with the transverse elements, one single plane practically perpendicular to that defined by the transverse elements and the supporting feet.

There would, of course, be little inconvenience if the supporting feet and the lateral elements of the structure were articulated on axes traversing the transverse elements, because this would have no other effect that to offset them slightly relative to the transverse elements.

Likewise, it is possible that the caps supporting the axes of articulation be able to be oriented as desired on the transverse elements of the structure by a simple movement of rotation.

From all evidence, the single or double caps can very well be constituted by two identical plates crimped on either side of the transverse elements.

Without departing from the scope of the invention, the articulations, as well as all the parts moving relative to one another, can be more or less braked as desired by screws or inserted spring washers. Also, it can be arranged that their range of movement be limited.

It is also helpful if the web of flexible cloth, made preferably of woven plastic, be tightly stretched over the open structure of the device in order to serve its purpose correctly and make it possible to support a load without yielding unduly.

It also proves necessary, at least in the case where the elements of the structure are articulated together, that the articulations concerned be lockable in the required position. With this in mind, one of the means provided, which makes it possible to lock, by compression, the lateral elements of the structure in open position, includes a toggle joint comprising two bars which can pivot on one another with a stop at dead-center and which are articulated at the end, on the one hand on the lateral element and on the other hand on the transverse element, practically equidistant from the main articulation of these two components of the structure of the device.

The same type of toggle joint can be used to hold, when necessary, the supporting feet in open position, but it is also possible that the caps supporting the axes of articulation of the supporting feet include a stop which limits their opening to, for example, 100°, and that by so doing, in opposition, on either side of the median articulation, these opening angles make the device stable.

One means for supporting the web under the influence of a substantial load, which threatens, by flexing, to bring the free ends of lateral elements closer together, includes a strap of adjustable length, fixed to the center of the unstructured edge of the web of cloth and adapted to be attached to the rear side of the frame of the rear seat.

Another complementary means making it possible to reinforce or insure the desired tension of the web of cloth, includes maintaining the opening of the lateral elements with the aid of straps of adjustable length fixed to each end of the device close to the unstructured edge of the flexible web, and attaching either on each side of the frame of the rear seat, or on intermediate points, after going over the seat rest of the rear seat, or on a point of bodywork of the vehicle. This embodiment also has the advantage of correctly maintaining the device between the seats of the vehicle in the preferred position of use.

The device also can be kept on a horizontal plane by fixed straps, on the one hand, on the rigid structure of the device and on the other hand, by means of rigid hooks catching sufficiently ahead of the device on elements of the bodywork, such as on the points of attachment of the safety belts, the positioning of the device against the backs of the front seats of the vehicle is also insured.

In other cases the device can be held against the backs of the front seats of the vehicle by means of spring levers or adjustable stops, fixed on the structure of the device and pressing against the front face of the rear seat.

Without departing from the spirit of the invention, and according to another means of embodiment, the rigid U-shaped structure of the device has a single point of articulation situated in the middle and thus exhibits an L-shaped profile, when the device is folded up. The supporting feet then fold back, respectively, in the plane of the components to which they belong, by a single movement of rotation.

According to another embodiment of the device, the transverse part of the open structure is formed by two elements sliding in one another, so that, according to their more or less extended overlap, different and adjustable widths of the device are obtained when it is unfolded. The web of cloth, stretched between the side elements of the structure, can be retained at different points.

When, for storage, the two sliding elements are brought inside one another, and the lateral elements as well as the supporting feet are folded, the set of rigid elements of the device form a bundle of parallel tubes around which the web of flexible cloth is wound.

With a view to comfort and safety, it is planned to add to the sides of the device removable and retractable protective cushions which make it possible to better fill the spaces that may exist between the device and the seats or doors of the vehicle, and also to offer protection from projecting components in the passenger space.

Other objects and advantages of the invention will appear more clearly on reading the descriptions of the various forms of embodiment which follow, given by way of non-limiting example, and represented in the attached drawings, in which.

Figure 1:
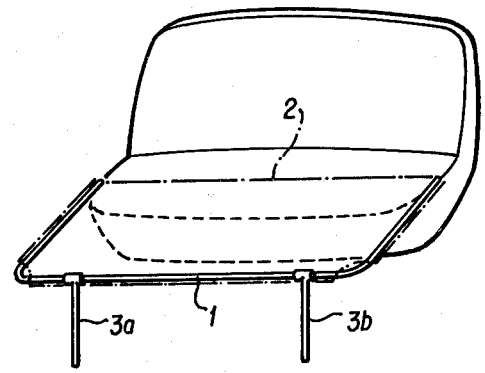
FIG. 1 is a perspective view of a first embodiment of the device, installed on the rear seat of the vehicle.

Referring to FIG. 1, the device represented, according to the invention and in a first embodiment, has a rigid structure 1 in the form of a U, on which a flexible web of cloth 2 is stretched, to constitute an extension of the rear seat of the vehicle. The unstructured side of the device rests in part on the seat, assuming the form thereof and causing no interference when it is installed, while the structured front has supporting feet 3a, 3b.

Figure 2:
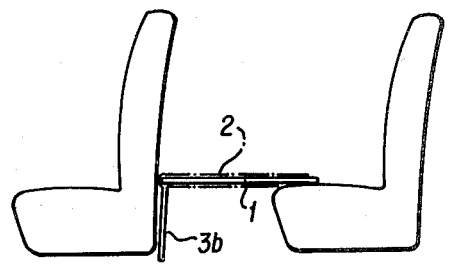
FIG. 2 is a side view of the first embodiment of the device installed between the front and rear seats of the vehicle.

FIG. 2 shows the device of FIG. 1 occupying the space ordinarily existing between the front seats and the rear seat of the vehicle, when it is placed against the backs of the front seats. As seen, the web 2 extends the rear seat on a horizontal plane.

Figure 3:
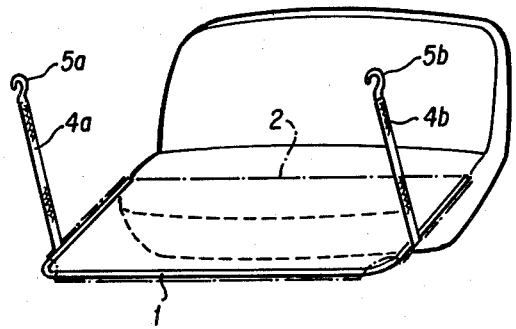
FIG. 3 is a perspective view of a second embodiment of the device installed on the rear seat of the vehicle.
Figure 4:
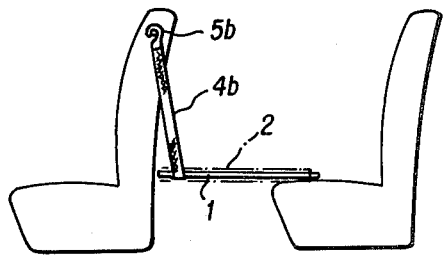
FIG. 4 is a side view of the second embodiment of the device installed between the front and rear seats of the vehicle.

FIGS. 3 and 4 represent an alternative form of the first embodiment in which the rigid structure 1 of the device is held on a horizontal plane by means of straps 4a, 4b adapted to be suspended by their respective attachment hooks 5a, 5b on bodywork elements of the vehicle. The bodywork elements, for example, members on the sides of the front seats are situated far enough in front of the anchor points of straps 4a, 4b on the rigid structure 1 of the stabilized device so that the front of the device will be automatically urged to contact against the backs of the front seats of the vehicle.

Figure 5:
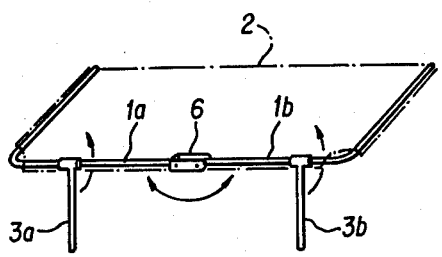
FIG. 5 is a perspective view of a third embodiment in which the device is collapsible, and unfolded for use.

According to another embodiment represented in FIG. 5, the front part of the frame 1 of the device according to the invention has a double articulation or hinge 6, at its center. The opening of articulation 6 is limited to 180° and it separates the rigid structure into two symmetrical sections 1a, 1b, each of which includes both of the front pieces and one side piece of the frame. On each of the front pieces of the two rigid elements 1a, 1b, a supporting foot 3a, 3b is orientable in order to be integrated in the plane defined by each of the sections.

Figure 6:
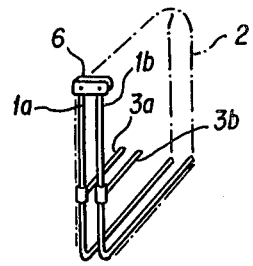
FIG. 6 is a perspective view of the third embodiment of the device, folded for storage.

FIG. 6 shows the device of FIG. 5 folded at the point of the double median articulation 6. The value of which being able to orient the supporting feet 3a, 3b in the planes of the rigid structural element sections 1a, 1b, receiving them and which become parallel to one another, become clear. In this position, ready for storage, the flexible cloth web 2 is folded in two with the structure of the device which then takes up practically one half the space occupied when it is unfolded in condition for use.

Figure 7:
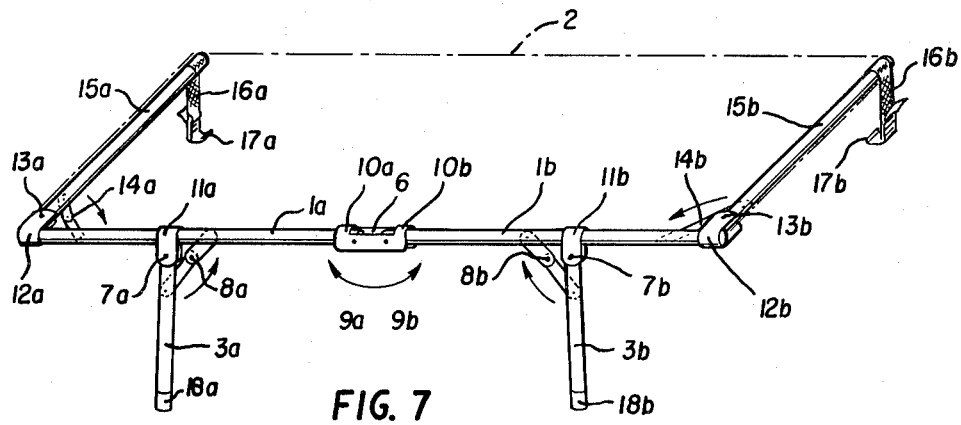
FIG. 7 is a perspective view of a fourth embodiment in which the device is again collapsible and unfolded for use.

According to another preferred form of embodiment of the device shown in FIG. 7, the open and rigid three-sided structure is formed by two front elements 1a, 1b, articulated on two parallel pivot axes 9a, 9b supported by a median cap 6. There are two lateral, or side elements 15a, 15b, themselves articulated in a different plane around the respective axes 13a, 13b, supported by caps 12a, 12b. The caps 12a, 12b are fixed to the ends of the front transverse elements 1a, 1b and on which are also fixed, caps 11a, 11b which support pivot axes 7a, 7b, around which are articulated the supporting feet 3a, 3b.

In position of use, with the device unfolded, the two front elements 1a, 1b are aligned in the extension of one another by means of cap 6 which has articulation stops 10a, 10b to limit the opening to 180°. In this same position, the lateral elements 15a, 15b form an angle of about 90° with the respective front elements 1a, 1b and are held open by means of toggle joints 14a, 14b having a dead-center, in order that the web of cloth 2, fixed to these various elements, will be stretched. The toggle joints 14a, 14b which are articulated between lateral elements 15a, 15b, and transverse elements 1a, 1b, are designed to be folded at the same time as them, while their locking in the required position is obtained by compression of the links 14a, 14b having passed their dead center.

The supporting feet 3a, 3b have sliding means of adjustment 18a, 18b in length, and are likewise locked in unfolded position for an opening of about 90° by means of other toggle joints 8a, 8b having a dead center, and acting between them and the front elements 1a, 1b. The plane, in which feet 3a, 3b take position when they support the device, being generally perpendicular to the plane defined by the web of cloth 2, resting on the rear seat of the vehicle.

When the device is to withstand a heavy load, and in order to prevent the web of cloth 2 from yielding too much owing to a possible bending of the lateral elements 15a, 15b, it is helpful to stretch adjustable length belts 16a, 16b, fixed on either side of the unstructured edge of the web of cloth 2, after having fastened them to the lower edges of the seat with the aid of hooks 17a, 17b. These straps 16a, 16b, which prevent the ends of lateral elements 15a, 15b, from coming together, also insure a good positioning, and maintenance of the device, when put in place on the rear seat, and applied against the backs of the front seats of the vehicle.

Figures 8, 9:
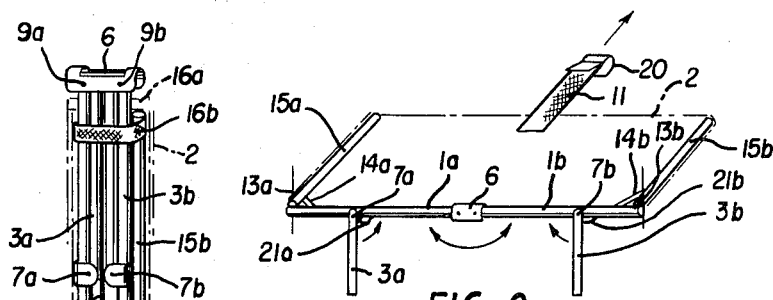
FIG. 8 is a perspective view of the fourth embodiment of the device folded for storage.
FIG. 9 is a perspective view of a fifth embodiment in which the device is likewise collapsible and unfolded for use.

FIG. 8 shows the same device folded into a minimum volume to facilitate storage. It is seen that the supporting feet 3a, 3b articulated on axes 7a, 7b as well as the lateral elements 15a, 15b, articulated on the axes 13a, 13b, are folded against the front elements 1a, 1b which are themselves folded against one another by means of the double median articulation 6 which supports the axes of articulation 9a, 9b. The flexible web of cloth 2 and the tension straps 16a, 17b, naturally, are wound around the rigid elements of the device which are regrouped parallel to each other.

According to another form of embodiment shown in FIG. 9, the lateral elements 15a, 15b of the structure, as well as the supporting feet 3a, 3b of the device, are articulated respectively around axes 13a, 13b and 7a, 7b, passing through the front elements 1a, 1b and on which are fixed the stops 21a, 21b which limit the range of the supporting feet 3a, 3b to an opening of about 100° in order to insure good stability for the device when installed. With this embodiment, and again with a view toward preventing the web of cloth 2 from yielding because of having to support a heavy load in its center, and although the lateral elements 15a, 15b of the device will be locked in open position by links 14a, 14b, there is added an adjustable length strap 19, fixed in the middle of the unstructured edge of the web of cloth 2, and whose free end has a hook 20 that catches behind the rear seat of the vehicle.

Figure 10:
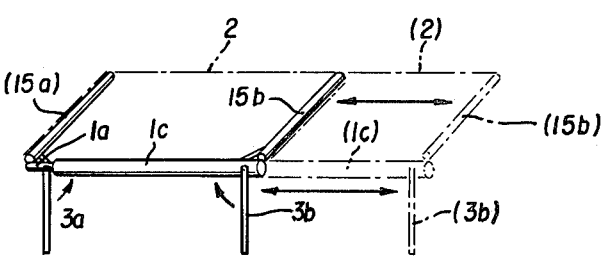
FIG. 10 is a perspective view of a sixth embodiment in which the device is adjustable in size and collapsible, unfolded for use in its smallest size, and, in dotted lines, in its largest size.

According to another embodiment of the device as shown in FIG. 10, one front element 1a, made of a small-diameter tube, slides inside front element 1c made in this case of a tube of larger diameter. The well defined positionings of these tubes determine different spreads between the lateral elements 15a, 15b, knowing that for each spread, the web of cloth 2 fixed on lateral element 15a passes around the other lateral element 15b and by overlapping, is fixed on itself where desired.

Figure 11:
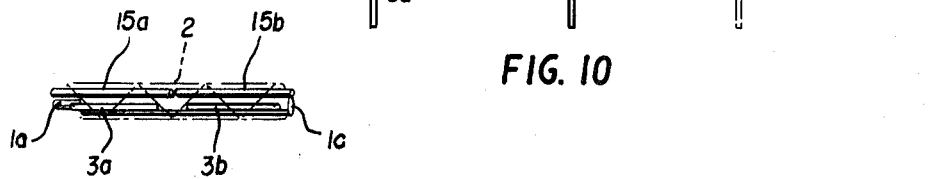
FIG. 11 is a perspective of the sixth embodiment of the device folded for storage.

FIG. 11 shows the embodiment of FIG. 10 folded for storage. The lateral elements 15a, 15b and the supporting feet 3a, 3b are folded against front elements 1a, 1b, fitting inside one another to form a bundle of parallel tubes around which the web of cloth 2 of the device is wound.

Figure 12:
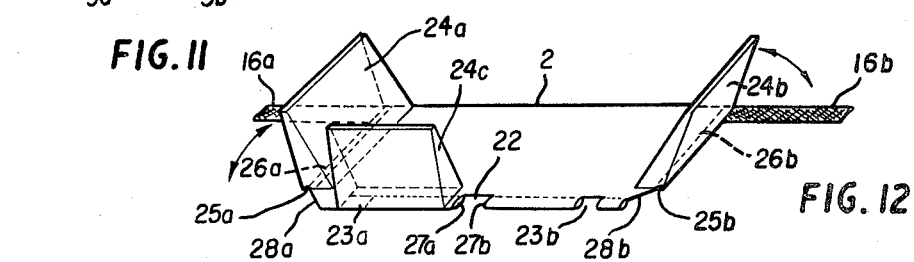
FIG. 12 is a perspective view of the web of the device equipped with removable protective cushions.

According to the embodiment of FIG. 12, the web of cloth 2 which also has tension straps 16a, 16b, receives removable protective cushions, 24a, 24b, 24c. These are pivotable on hinges 26a, 26b, 26c which enable them to adapt to the shapes and sizes of the passenger space of the vehicle, by pivoting around sleeves 25a, 25b and 27a, 27b of the web of cloth 2 in which the elements of the rigid structure of the device are threaded. Cuts 22, 23a, 23b, 28a, 28b are made in web 2 to permit the passage of the articulations and the means for locking, in unfolded position, the rigid elements of the device (not shown).

In the preferred embodiments, the rigid elements are made of aluminum alloy tubing and the web of flexible cloth of woven plastic, which allows the device to be light, practical, sturdy, compact and inexpensive.

It can be seen from the foregoing that according to the objects of the invention, the device does prolong the rear seat of the vehicle by closing the space ordinarily separating the rear seat and the front setas. Thus, there is a substantial increase in the room available for children with a view to comfort and safety.

It is clear that, without departing from the scope of the invention, other means could be provided to reach the same ends. Thus the double median articulation can be replaced by a single articulation. The locking of the mobile elements can be done by means of an attachment tab and a brace, without thereby having these examples be limiting.

The invention, therefore, comprises all means constituting technical equivalents of those just presented, considered separately or in combination, and applied within the scope of the following claims.

What is claimed is:

1. Apparatus for forming a cot adapted for use for the rear seat of a vehicle comprising
   a having three sides only formed by a front element and a lateral element extending from each end of said front element,
   a web of flexible cloth stretched between said three frame elements, the portion of the web extending from the unstructured rear of the frame adapted to rest directly on the vehicle rear seat, and
   means connected to said frame adapted for supporting the frame from a fixed point of the body of the vehicle.

2. Apparatus as in claim 1, wherein said supporting means comprises at least one support foot connected to and extending from the frame and adapted to rest on the floor of the vehicle.

3. Apparatus as in claim 1, wherein said supporting means comprises means connected to said frame adapted for hanging the frame from a fixed point of the vehicle.

4. Apparatus as in claim 3, wherein said hanging means comprises at least one strap attached to the frame and having means thereon for attachment to a fixed point of the vehicle.

5. Apparatus as in claim 1, wherein the front element of the frame further includes means for folding said front element into two sub-elements.

6. Apparatus as in claim 5 further comprising means for folding said side elements of the frame to lie generally parallel to the folded sub-elements of the front element.

7. Apparatus as in claim 5, wherein said supporting means comprises at least one foot connected to and extending from the frame and adapted to rest on the floor of the vehicle, and means for folding said supporting foot to lie along the folded sub-elements of the front element.

8. Apparatus as in claim 1 further comprising means for folding each of said side elements to lie along the front element and means for locking each of said side elements at an angle substantially of 90° to the front element so that the web of the cloth will remain stretched when the device is in use while permitting the elements to be folded generally parallel to one another to form a bundle around which the web of flexible cloth can be wound in.

9. Apparatus as in claim 1 wherein said front element of the frame is formed by two elements which telescope one within the other, the web of flexible cloth being wound on one of said side elements.

10. Apparatus as in claim 5, wherein the means for folding the front element comprises a cap connected to one of said sub-elements which supports at least one axis of articulation for a sub-element.

11. Apparatus as in claim 10, wherein the means for folding has two axes of articulation, a respective sub-element of the front element being folded about a respective said axis.

12. Apparatus as in claim 6, wherein the means for folding the side elements comprises a respective cap connected between the front element and a corresponding side element.

13. Apparatus as in claim 10, wherein the cap is formed by two plates crimped on either side of the sub-elements supporting them.

14. Apparatus as in claim 12, wherein the cap is formed by two plates crimped on either side of the elements supporting them.

15. Apparatus as in claim 6, wherein the means for folding the side elements permit said side elements to be oriented by rotation around the front element.

16. Apparatus as in claim 7, wherein the means for folding the supporting foot permit the foot to be oriented by rotation around the front element.

17. Apparatus as in claim 6 further comprising toggle joints having a dead center for locking at least one of the folding means.

18. Apparatus as in claim 6 further comprising connecting tabs and braces on at least one of the folding means for locking said folding means.

19. Apparatus as in claim 1, further comprising a respective strap having one end attached to the free end of each of said side elements of the frame, and means on the other end of each of the straps for attachment to a fixed point on the vehicle.

20. Apparatus as in claim 1 further comprising a strap having one end attached to the unstructured side of the web of cloth, and means on the free end of the strap for attachment to a fixed point on the vehicle.

21. Apparatus as in claim 1 further comprising cushion means on at least one side of the frame and attached to said web.

22. Apparatus as in claim 21, wherein said cushion means are retractable and removable.

* * * * *